US006282579B1

(12) United States Patent
Carre

(10) Patent No.: US 6,282,579 B1
(45) Date of Patent: *Aug. 28, 2001

(54) METHOD FOR SUPPORTING ADDRESS INTERACTION BETWEEN A FIRST ENTITY AND A SECOND ENTITY, CONVERTER FOR ADDRESS INTERACTION, AND COMPUTER SYSTEM

(75) Inventor: Laurent Carre, Voisins-le-Bretonneux (FR)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/915,169

(22) Filed: Aug. 20, 1997

(30) Foreign Application Priority Data

Aug. 20, 1996 (EP) ............................... 96 440 065

(51) Int. Cl.⁷ ............................. G06F 9/54; G06F 17/28
(52) U.S. Cl. ................................ 709/313; 717/5
(58) Field of Search ..................... 395/707; 709/300, 709/315, 316, 313, 310; 717/5

(56) References Cited

U.S. PATENT DOCUMENTS

| | | | |
|---|---|---|---|
| 5,261,077 | * 11/1993 | Duval et al. ............................ | 395/500 |
| 5,283,878 | * 2/1994 | Murray ............................ | 395/425 |
| 5,432,925 | * 7/1995 | Abraham et al. ............................ | 395/500 |
| 5,726,979 | * 3/1998 | Henderson et al. ............................ | 370/254 |
| 5,923,879 | * 7/1999 | Sasmazel et al. ............................ | 395/705 |
| 5,983,233 | * 11/1999 | Potonniee ............................ | 707/103 |
| 6,052,526 | * 4/2000 | Chatt ............................ | 395/705 |

OTHER PUBLICATIONS

IBM Technical Disclosure Bulletin, vol. 35, No. 2, Jul. 1992 "Method for Universal Mac Frame Encoding" pp. 489–493.
IBM Technical Disclosure Bulletin, vol. 37, No. 4B, Apr. 1994 "Method for Algorithmic Creation of Distinguished Names for SNA Resources" pp. 141–144.
"Management Framework for Open Systems Interconnection (OSI) for CCITT Applications", CCITT Recommendation X.700 (Sep. 1992).
Digital Equipment Corporation. "COM/CORBA Interworking", Aug. 22, 1995.*
Mazumdar, Subrata. "Translation of GDMO/ASN.1 Specification into CORBA–IDL", Jul. 14, 1994.*
OMG. "Corba Interoperability", 1995.*

* cited by examiner

Primary Examiner—Majid A. Banankhah
Assistant Examiner—Lewis A. Bullock, Jr.

(57) ABSTRACT

To support address interaction between a first entity and a second entity which use different addressing modes with address types in different specification languages and with address values of different semantics, an address type with an address value according to the first addressing mode is converted to a correspondent type of the other specification language. The correspondent type is so constructed that it contains both the address value according to the addressing mode of the first entity and the address value according to the addressing mode of the second entity.

12 Claims, 6 Drawing Sheets

Fig. 4a

```
// AttributeValue ::= ANY
//
   typedef any     AttributeValueType;

// AttributeValueAssertion::= SEQUENCE   { attributeType AttributeType,
//                                         attributeValue ANY DEFINED BY attribute type
//                                       }
   struct AttributeValueAssertionType    {
          AttributeValueTypeType     attributeType;
          AttributeValueType         attributeValue;
   };

// Redefinition
   typedef  AttributeValueAssertionType AVAType ;

// RelativeDistiguishedName ::= SET OF AttributeValueAssertion
//
   typedef sequence<AttribueValueAssertionType>
   RelativeDistinguishedNameType;
```

```
// RDNSequence::= SEQUENCE OF RelativeDistinguishedName
// typedef sequence<RelativeDistinguishedNameType> DistinguishedNameType;
typedef sequence<RelativeDistinguishedNameType> RDNSequence Type;

//
// ObjectInstance::= CHOICE
//     {distinguishedName [2] IMPLICIT DistinguishedName,
//      nonSpecificForm [3] IMPLICIT OCTET STRING,
//      localDistinguishedName [4] IMPLICIT RDNSequence}
// enum   ObjectInstanceTypeChoice {
       distinguishedNameChoice,
       nonSpecificFormChoice,
       localDistinguishedNameChoice
};

union ObjectInstanceType switch (short /*ObjectInstanceTypeChoice*/) {
       case 1/*distinguishedNameChoice*/: DistinguishedNameType distinguishedName;
       case 2/*nonSpecificFormChoice*/: ASN1_OctetString nonSpecificForm;
       case 3/*localDistinguishedNameChoice*/: RDNSequenceType
localDistinguishedName;
};
```

Fig. 5

```
// Generic managed object interface interface ManagedObject {
    // The content of this definition is not significative for the patent
};
// ObjectInstance translation to IDL // this enumeration defines the type of reference contained in the
// object instance (name are not signifcative for the patent)

enum ObjectRefChoice {
    None,                    // no object reference in the instance
    DirectObjectReference,   // the CORBA object reference is in it
    LocalObjectReference // a private object reference is in it
};

union ObjectInstanceRef switch (ObjectRefChoice) {
    case DirectObjectReference: ManagedObject objectRef;
    case LocalObjectReference: any privateObjectRef;
};

union CmiseObjectInstanceType switch
            (short/*ObjectInstanceTypeChoice*/) {
    case 1/*distinguishedNameChoice*/:   DistinguishedNameType
                                               distinguishedName;
    case 2/*nonSpecificFormChoice*/: ASN1_OctetString nonSpecificForm;
    case 3/*localDistinguishedNameChoice*/: RDNSequenceType
                                    localDistinguishedName;
};
```

METHOD FOR SUPPORTING ADDRESS INTERACTION BETWEEN A FIRST ENTITY AND A SECOND ENTITY, CONVERTER FOR ADDRESS INTERACTION, AND COMPUTER SYSTEM

BACKGROUND OF THE INVENTION

1. Technical Field of the Invention

This invention relates to a method for supporting address interaction between a first entity and a second entity which use different addressing modes with address types in different specification languages and with address values of different semantics, the method including the step of converting an address type with an address value according to the first addressing mode to a corresponding type of the other specification language, to a converter for address interaction between a first entity and a second entity, and to a computer system.

2. Discussion of Related Art

To implement distributed computer systems in software, object-oriented modeling is increasingly being used as an architectural principle.

Such a software architecture of a computer system is the CORBA architecture (CORBA=Common Object Request Broker Architecture), which is an important component of the OSA architecture (OSA=Object Service Architecture), specified by the Object Management Group (OMG). Objects conforming to this specification, henceforth called "CORBA objects", are specified by means of the specification language CORBA IDL (IDL=Interface Definition Language). All types of such an object are also specified in this language, i.e., in CORBA IDL.

For the area of network management, an object model has been standardized in an OSI (Open Systems Interconnection) standard (Management framework for open systems interconnection, ITU-T Recommendation X.700, 1992). Its objects, henceforth called "OSI objects", are specified in the specification language ASN.1 (Abstract Syntax Notation). All types of such an OSI object, including the address type used for addressing, are also specified in this language, i.e., in ASN.1.

During address interaction between OSI objects and CORBA, problems arise: The CORBA architecture and the OSI architecture use different addressing concepts. The OSI architecture uses a logic address (full distingushed name), while the CORBA architecture uses a physical address.

The invention starts from the usual procedure for address interaction: An address type defined in ASN.1 is converted to a correspondent IDL address type, which then transmits the address value to another object unchanged, e.g., via a CORBA infrastructure. If the correspondent CORBA address value is needed at, for example, the target object or during transport over the CORBA infrastructure, it will be determined by means of a central service.

SUMMARY OF THE INVENTION

The object of the invention is to permit address interaction between objects in an object environment containing objects which use different addressing modes.

According to a first aspect of the present invention, a method for supporting address interaction between a first entity and a second entity which use different addressing modes with address types in different specification languages and with address values of different semantics, said method comprising the step of converting an address type with an address value according to the first addressing mode to a correspondent type of the other specification language, is characterized in that the correspondent type is so constructed that it contains both the address value according to the addressing mode of the first entity and the address value according to the addressing mode of the second entity.

According to a second aspect of the present invention, a converter for address interaction between a first entity and a second entity which are designed to use different addressing modes with the address types in different specification languages and with address values of different semantics, the converter being designed to convert an address type with an address value according to the first addressing mode to a correspondent type of the other specification language, is characterized in that the converter is designed to construct the correspondent type in such a way in that it contains both the address value according to the addressing mode of the first entity and the address value according to the addressing mode of the second entity.

In accordance with a third aspect of the present invention, a computer system comprising at least one first entity and at least one second entity which are designed to use different addressing modes with different address types in different specification languages and with address values of different semantics, and further comprising at least one converter designed to convert an address type with an address value according to the first addressing mode to a correspondent type of the other specification language, is characterized in that the converter is designed to construct the correspondent type in such a way that it contains both the address value according to the addressing mode of the first entity and the address value according to the addressing mode of the second entity.

The idea underlying the invention is to convert a first address type with a first address value to a correspondent, second address type of another specification language which does not correspond to the source-address type but contains as an additional value the address value according to the other addressing mode. Thus, both address values are transported in the second type and are available both during the transport of a message with this type and at the target object. At all these points it is no longer necessary to invoke the central service for a semantics conversion. Thus, only one semantics conversion is necessary, namely when entering the second value into the second type.

This eliminates the need for a great number of semantics conversions and, thus, for a multitude of messages to be exchanged with the central semantics conversion service. Particularly in computer systems with a great number of objects, the semantics conversion is very complex. A high performance gain is thus achieved.

Another advantage is that the structure of the application software is reduced. No semantics conversion takes place, since this is performed at the type conversion level. Both addressing modes are handled by a single construct. This provides savings in development time and development costs.

BRIEF DESCRIPTION OF THE DRAWINGS

The invention will become more apparent from the following description of an embodiment taken in conjunction with the accompanying drawings, in which:

FIGS. 4a and 4b together show is a representation of a first type definition in a specification language; and FIG. 5 is a representation of a second type type definition in a specification language.

DETAILED DESCRIPTION OF PREFERRED EMBODIMENTS

In the embodiment described in the following, the method according to the invention is carried out in a computer system according to the invention.

Figure 1:
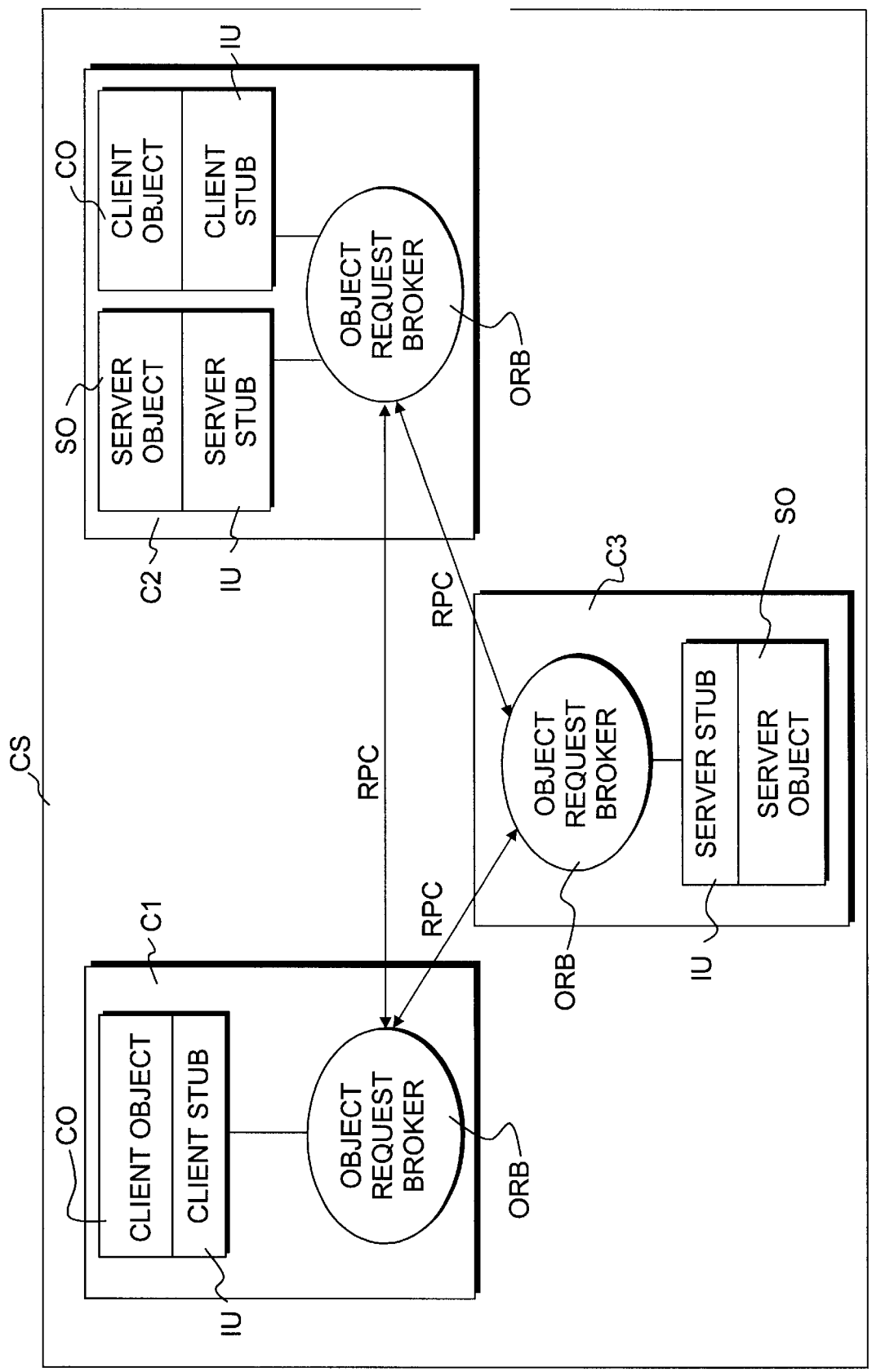
FIG. 1 is a block diagram of a computer system according to the invention.

FIG. 1 shows a computer system CS with three computer entities C1 to C3 which communicate with one another.

The computer entities C1 to C3 are, for example, computers, printers, or network elements of a communications network. They each have a hardware platform, consisting of processors, memory devices, and peripheral components, a software platform, comprising an operating system and a database system, for example, and applications formed by application program modules running on the software platform. The computer entities C1 to C3 are interconnected by one or more communications networks, such as X.25, #7, Ethernet, or token-ring communications systems. The software platforms of the computer entities C1 to C3 provide the necessary data transmission services.

The application program modules are modeled as objects (managed objects), i.e., the code and the data of an object are represented by a sum of attributes and functions which can be accessed by other objects. Through mutual access by a plurality of such objects, the application functions of the computer system CS are provided.

According to the CORBA architecture, the computer entities C1 to C3 have several client objects CO and server objects SO and several object request brokers ORB.

From a service point of view, each of the objects CO and SO can be regarded as an encapsulated entity which provides one or more services that can be requested by a client. The objects CO request services (client objects) which are provided by the objects SO (server objects).

To request a service, a CO sends a request message to an SO. Such a request message contains the following information: an operation, a target object, one or more parameters, and, optionally, a request context. After the service has been provided, the SO sends an outcome message defined for this request message to the CO.

For sending and receiving the request and outcome messages, each of the objects SO and CO has an interface unit IU.

The object request brokers ORB provide an infrastructure which enables the objects to communicate in a distributed environment. It thus makes no difference to the objects CO in which of the other computer entities C1 to C3 an object SO whose service they want to request is resident and on which specific platform or in which form the object is implemented.

To this end, each object knows at least one object request broker ORB and how to contact this local object request broker. Each object request broker knows how to contact and communicate with other object request brokers. For this purpose, the object request broker uses the RPC mechanism (RPC=Remote Procedure Call). An object thus sends a request message to one of the object request brokers ORB, from which the request message is routed to the target object by the CORBA infrastructure formed by the object request broker ORB.

To be able to interact via the CORBA infrastructure by means of CORBA mechanisms and cooperate with other objects on this infrastructure, each of the objects Co and SO must have a CORBA-specific interface. Such an interface contains a description of a set of possible operations which another object can request from this object. The interfaces of the objects are defined in the specification language IDL (Interface Definition Language). The inheritance of these interfaces makes it possible for an object to support two or more interfaces.

In CORBA, an object is accessed directly via this CORBA-specific interface. The implementation of this interface is the object itself. It consists of a code and data and thus requires no agent entity, which is necessary if an object is represented exclusively by a data structure.

Besides the objects CO and SO, the computer system contains further objects, which are not shown in FIG. 1. These are not specified in CORBA and interact with one another and with the objects CO and SO via specific interface units and the above-described CORBA infrastructure.

The use of such hybrid components on a CORBA infrastructure has the advantage that existing objects specified according to another object-model architecture can be reused and that a cooperation between such objects and CORBA objects is made possible. This has great advantages mainly in the network management area, since a large number of objects specified according to the OSI object model exist in this area. OSI network management components, such as manager, agent, and mediation device, are formed by one or more such OSI objects.

For the network management area, an object model has been standardized in an OSI (Open Systems Interconnection) standard (Management framework for open systems interconnection, ITU-T Recommendation X.700, 1992). Besides the object model (SMI=Structure of Management Information), fundamental objects, a set of management services (CMIS=Common Management Information Service definition), and a network management protocol (CMIP=Common Management Information Protocal) are specified for communication between the objects. Objects are specified in the specification language GDMO (=Guidelines for Definition of Managed Objects), which uses ASN syntax and contains further macros.

The basic difference between "natural" CORBA objects and "natural" OSI objects consists in the fact that CORBA objects represent the implementation of the CORBA interface, whereas the OSI objects of a network management element are stored as a data structure in the MIB (Management Information Base) data record and are manipulated by an agent, with which communication is carried out by means of the CMIP protocol. In addition, their data types are specified in different specification languages, namely in CORBA IDL and in ASN.1, and are thus not compatible.

FIGS. 2a, 2b, 3a, and 3b show possible implementations of OSI entities on a CORBA infrastructure and possible manners of interaction between CORBA entities and OSI entities via a CORBA infrastructure. Possible interaction via a CORBA infrastructure implies such an interaction between entities in different specification languages. It requires the same procedure. An "entity" is considered here to be an item with one or more objects.

Figure 2A:
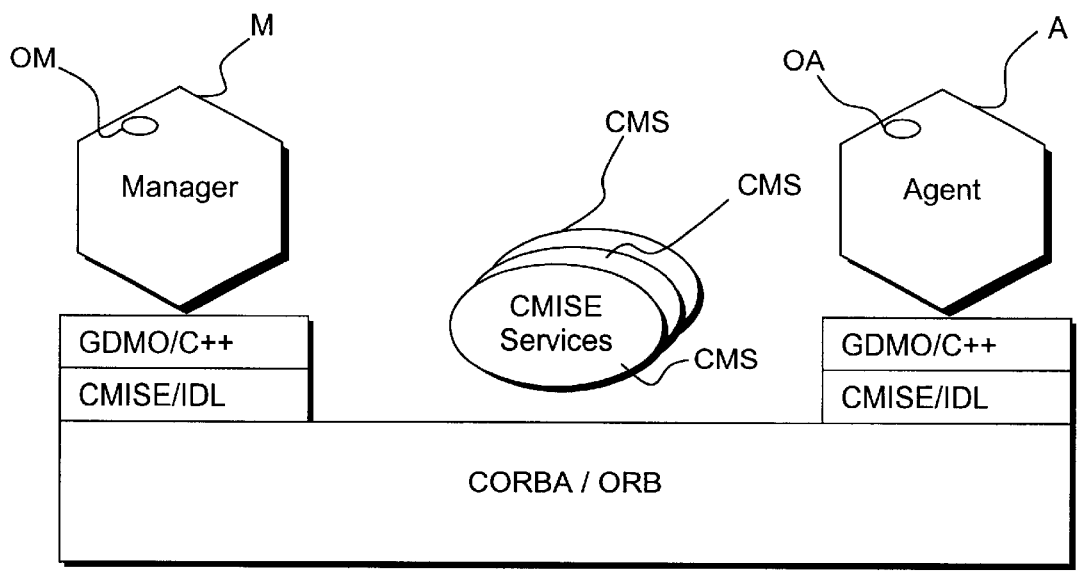
FIG. 2a is a functional representation of a first possible manner of interaction between differently specified objects.

FIG. 2a shows a communication layer CORBA/ORB, several CMISE services CMS generally available via this communication layer, two network management components M and A, and two communication functions GDMO/C++ and CMISE/IDL between each of these components and the communication layer CORBA/ORB. The components M and A are not CORBA objects, but the component M consists of one or more OSI objects OM and a manager unit, and the component A consists of one or more OSI objects OA and an agent unit. Each of the components M and A thus represents an OSI entity. By means of the agent and manager units, operations are performed on these objects and requests are sent to other objects, respectively. The agent unit and the manager unit communicate via the CMIP protocol. From a network management point of view, the component M plays the role of a manager and the component A that of an agent.

The communication entity GDMO/C++ consists of one or more specific access objects which make it possible to perform CMISE operations on the object OA or OM.

The CMISE management services are implemented by a CMISE object on the side of the object OA. The interface unit CMISE/IDL contains this CMISE object and the services assigned to this object. The CMISE object of the interface unit CMISE/IDL is specified by an IDL interface, and acts, and thus appears to the outside, like a CORBA object. To permit this specification and, thus, the provision of a CORBA interface for the object OA, type conversion from ASN.1 to IDL, or type interoperability, is necessary. How this type interoperability is achieved will be shown later with the aid of FIGS. 4a and 4b. CMISE services thus provide a set of CORBA objects. Through the CORBA request routed via the CORBA infrastructure, CMISE operations can thus be performed on the object OA. The same applies to the object OM.

Figure 2B:
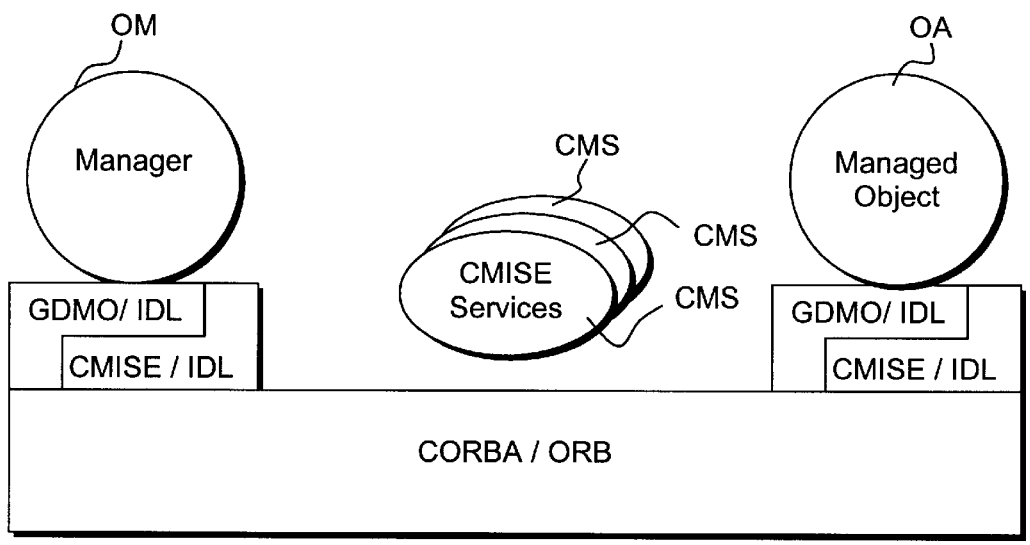
FIG. 2b is a functional representation of a second possible manner of interaction between differently specified objects.

A second possible manner of interaction between CORBA entities and OSI entities via a CORBA infrastructure is illustrated in FIG. 2b.

FIG. 2b shows the communication layer CORBA/ORB, several CMISE services CMS generally available via this communication layer, the objects OM and OA, and two communication functions GDMO/IDL and CMISE/IDL between each of these objects and the communication layer CORBA/ORB.

The interface unit GDMO/IDL translates the OSI objects OM and OA of the components from GDMO to IDL. An object so specified can be accessed by classic CORBA messages. Each of these OSI objects is thus transformed into a pure CORBA object. Since the specifications in IDL and ASN.1 are of different natures (interface description ⇆ object specification), complete translation is not possible and only a subset of CMISE services is offered via the interface unit GDMO/IDL. This means that only a subset of CMISE operations can be performed on the transformed CORBA objects.

Figure 3A:
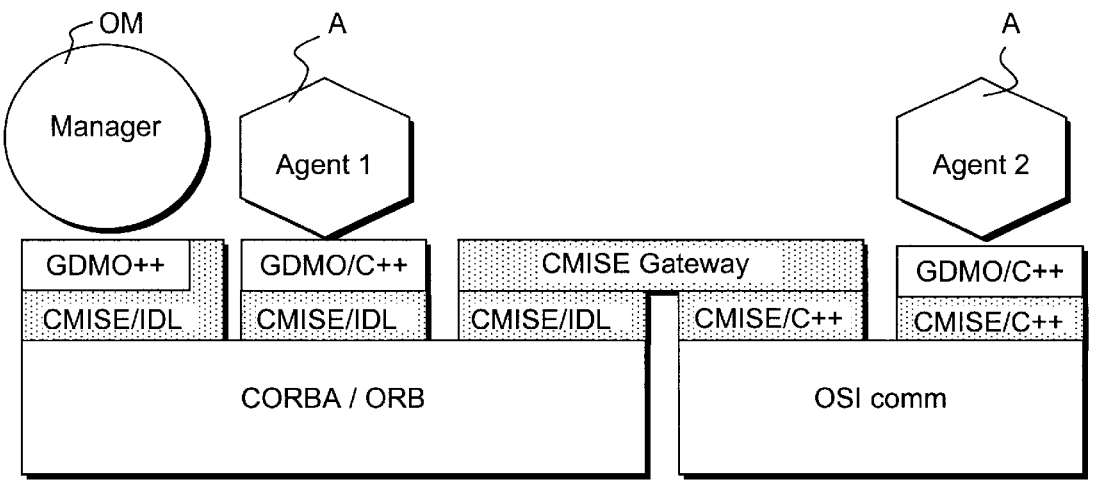
FIG. 3a is a functional representation of a third possible manner of interaction between differently specified objects.
Figure 3B:
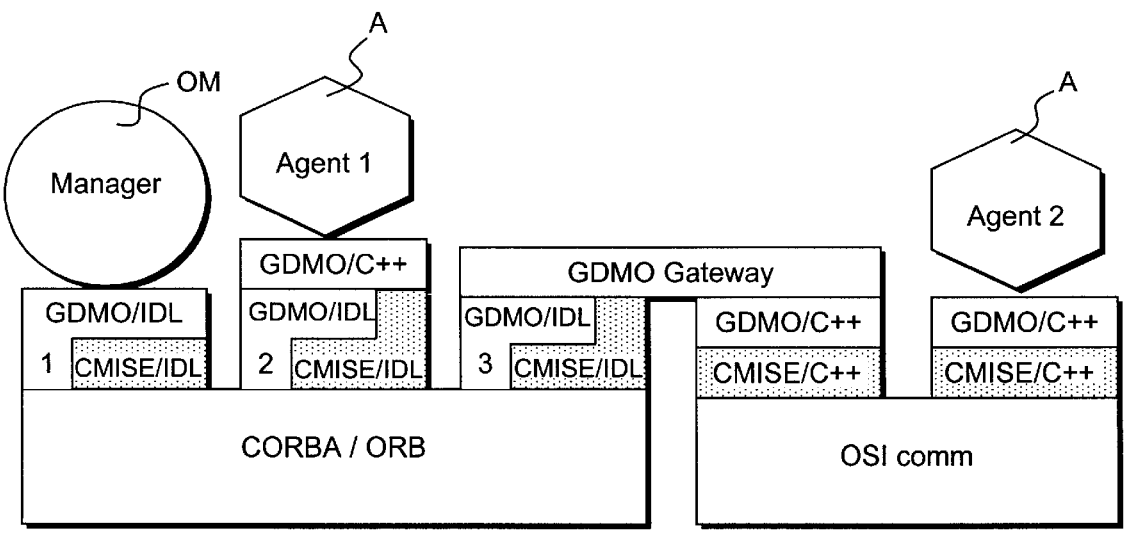
FIG. 3b is a functional representation of a fourth possible manner of interaction between differently specified objects.

FIGS. 3a and 3b show further possible manners of interaction between network management components in which a gateway GATE is incorporated. The mode of operation is apparent from the representation in FIGS. 3a and 3b in conjunction with the description of the corresponding entities given in connection with FIGS. 2a and 2b.

The steps involved in the address-type conversion are as follows.

The ASN type (object instance) of an OSI address value (object instance value) is converted to a correspondent IDL type which is so structured that it contains and transports both the CMIS/OSI full distinguished name, i.e., the logic OSI address corresponding to the object instance value, and the CORBA object reference, i.e., the physical CORBA address. This address is determined from the object instance value by means of a semantics conversion, e.g., by means of a central service.

It is also possible, however, to store these structures, i.e., the object instance value/object reference pair, for particular addresses already in the entity, so that they need not be requested by a central service. This is particularly advantageous for frequently used addresses, which can thus be "cached".

Both addresses are then transported in the data structure of the type and can thus be used both for the receiver and for interim entities of, for example, the CORBA infrastructure.

This conversion can be performed in the sending entity of FIG. 2a or FIG. 2b, but also in a gateway as shown in FIG. 3a or 3b.

The mechanism can also work in the other direction. If an object reference is to be transmitted using CMIP, for example, the entity or the gateway can enter, in addition to the object reference, the full distinguished name in the ASN.1 type converted from the type of the object reference.

In such a structure, i.e., in such a type, instead of the object reference, a private object reference may be entered, which is not known to the external object brokers.

FIGS. 4a and 4b together shows a description of a general possibility of mapping ASN.1 onto IDL data types. The procedure of the IDL translation of FIG. 4 is changed as shown in FIG. 5. This leads to a translation from OSI address types to CORBA address types in accordance with the invention.

It is also possible to provide for two alternative translations:

one which supports the full specification of CMIP, and another which only takes into account the most important variants of CMIP. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for supporting address interaction between a first entity and a second entity which use different addressing modes with address types in different specification languages and with address values of different semantics, said method comprising the steps of receiving an address type with an address value according to an addressing mode of the first entity and of converting said address type to a correspondent type of a specification language of the second entity, characterized in that the correspondent type is so constructed that it contains both a first address value according to the addressing mode of the first entity and a second address value according to an addressing mode of the second entity so that the first address value and the second address value are transported from the first entity to the second entity and are available both during the transport and at the second entity in order to reduce semantic conversion and message exchanges by and with a central service.

2. A method as claimed in claim 1, characterized in that the address value according to the second addressing mode is determined from the address value according to the first addressing mode and is entered in the correspondent type.

3. A method as claimed in claim 1, characterized in that for the interaction, the correspondent type is transferred to the second entity.

4. A method as claimed in claim 1, characterized in that the addressing mode of one of the entities uses ASN.1 as the specification language for specifying the address type.

5. A method as claimed in claim 1, characterized in that the addressing mode of one of the entities uses CORBA IDL as the specification language for specifying the address type.

6. A converter for address interaction between a first entity and a second entity using different addressing modes with address types in different specification languages and with address values of different semantics, said converter for converting an address type with an address value according to a first addressing mode to a correspondent type of another specification language, characterized in that the converter is for constructing the correspondent type with means for containing a first address value according to the first addressing mode of the first entity and with means for containing a second address value according to an addressing mode of the second entity so that both the first address value and the second address value are transported from the first entity to the second entity and are available both during the transport and at the second entity in order to avoid semantic conversion by a central service with a resultant reduction in messages exchanged with said central service.

7. A computer system comprising at least one first entity and at least one second entity for using different addressing modes with address types in different specification languages and with address values of different semantics, and further comprising at least one converter for converting an address type with an address value according to the first addressing mode to a correspondent type of the other specification language, characterized in that the converter is for constructing the correspondent type in such a way that it contains both a first address value according to the addressing mode of the first entity and a second address value according to an addressing mode of the second entity so that both the first address value and the second address value are transported from the first entity to the second entity and are available both during the transport and at the second entity in order to avoid semantic conversion by a central service with a resultant reduction in messages exchanged with said central service.

8. A computer system as claimed in claim 7, characterized in that the at least one first entity and the at least one second entity are for interacting with each other.

9. A computer system as claimed in claim 7, characterized in that said system includes at least two first entities that use transport mechanisms of the second entity and interact via said transport mechanisms.

10. A computer system as claimed in claim 7, characterized in that the first entity is an open systems interconnection entity.

11. A computer system as claimed in claim 7, characterized in that the second entity is a common object request broker architecture entity.

12. A computer system as claimed in claim 11, characterized in that the first entity is an open systems interconnection entity.

* * * * *